United States Patent
Harink et al.

(10) Patent No.: US 12,379,300 B1
(45) Date of Patent: Aug. 5, 2025

(54) MULTIPLEXED IMPEDANCE-BASED DETECTION METHODS AND SYSTEMS USING IMPEDANCE-ENCODED PARTICLES

(71) Applicant: Leiden Measurement Technology LLC, Sunnyvale, CA (US)

(72) Inventors: Matthijs Björn Marijn Harink, Santa Cruz, CA (US); Nathan Earl Bramall, Sunnyvale, CA (US)

(73) Assignee: Leiden Measurement Technology LLC, Sunnyvale, CA (US)

( * ) Notice: Subject to any disclaimer, the term of this patent is extended or adjusted under 35 U.S.C. 154(b) by 1156 days.

(21) Appl. No.: 17/106,702

(22) Filed: Nov. 30, 2020

(51) Int. Cl.
*G01N 21/64* (2006.01)
*G01N 15/10* (2024.01)
*G01N 15/1404* (2024.01)

(52) U.S. Cl.
CPC ..... *G01N 15/1404* (2013.01); *G01N 21/6428* (2013.01); *G01N 21/6486* (2013.01)

(58) Field of Classification Search
CPC .......... G01N 15/1404; G01N 21/6428; G01N 21/6486; G01N 21/64; G01N 15/10
See application file for complete search history.

(56) References Cited

U.S. PATENT DOCUMENTS 9,645,142 B2    5/2017    Chandler et al.

FOREIGN PATENT DOCUMENTS

WO    WO-2014062719 A2 *   4/2014   ............... C12Q 1/25

OTHER PUBLICATIONS

Feng et al., "A Microfluidic Device Integrating Impedance Flow Cytometry and Electric Impedance Spectroscopy for High-Efficiency Single-Cell Electrical Property Measurement", Anal. Chem., 2019, vol. 91, 15204-15212, published Nov. 8, 2019 (Year: 2019).*
Prakash et al.,"Design of a Multiplexed Analyte Biosensor using Digital Barcoded Particles and Impedance Spectroscopy", Scientific Reports, 2020, 10-6109, published 1-10, published Apr. 9, 2020 (Year: 2020).*
Caselli, Federica et al., A novel wiring scheme for standard chips enabling high-accuracy impedance cytometry; Sensors and Actuators B 256 (2018), pp. 580-589.
Feng, Yinnian et al., MRBLES 2.0: High-throughput generation of chemically functionalized spectrally and magnetically-encoded hydrogel beads using a simple single-layer microfluidic device; Retrieved from the Internet: https://www.biorxiv.org/content/10.1101/2020.06.22.166074v1, 19 pgs.
Gerver, R.E. et al., Programmable microfluidic synthesis of spectrally encoded microspheres, Lab Chip, 2012, 12, pp. 4716-4723.
Guo, Jia et al., Poly(N-isopropylacrylamide)-Coated Luminescent/Magnetic Silica Microspheres: Preparation, Characterization, and Biomedical Applications; Chem. Mater. 2006, 18, pp. 5554-5562.
Nair, Devatha P. et al., The Thiol-Michael Addition Click Reaction: A Powerful and Widely Used Tool in Materials Chemistry; American Chemical Society 2013, pp. 724-744.
Nguyen, Huy Q. et al., Peptide library synthesis on spectrally encoded beads for multiplexed protein/peptide bioassays; Proc. SPIE 10061, Microfluidics, BioMEMS, and Medical Microsystems XV, 100610Z (Feb. 28, 2017), 12 pgs.
Nguyen, Huy Quoc et al., Quantitative mapping of protein-peptide affinity landscapes using spectrally encoded beads; eLife 2019;8:e40499, Retrieved from the Internet: DOI: https://doi.org/10.7554/eLife.40499, 28 pgs.
Wilson, Robert et al., Magnetic microspheres encoded with photoluminescent quantum dots for multiplexed detection; Journal of Materials Chemistry, 2007, 17, pp. 4400-4406.
Xie et al., Top-down fabrication meets bottom-up synthesis for nanoelectronic barcoding of microparticles, Lab Chip, vol. 17 No. 11, pp. 1847-2024.

* cited by examiner

*Primary Examiner* — Gregory S Emch
*Assistant Examiner* — Nam P Nguyen
(74) *Attorney, Agent, or Firm* — Polygon IP, LLP

(57) ABSTRACT

Described herein are multiplexed impedance-based detection methods for identifying each type of impedance-encoded particles and systems for performing these methods. Impedance-encoded particles of each type comprise cores having the same structure and producing the same complex electrical impedance signature when an AC signal is applied to these particles. At the same time, different types of particles have different structures and produce different complex electrical impedance signatures, which allow differentiation of the different types of particles. In some examples, different types of particles have different functionalization, resulting in different analytes binding to or otherwise reacting with these particles. As such, these particles may be arranged into a test media to detect different analytes based on identifying each type of impedance-encoded particles using complex electrical impedance signatures. Furthermore, a multiplexed impedance-based detection system may include an optical detector to determine the concentration of these analytes or a particle sorter.

20 Claims, 7 Drawing Sheets

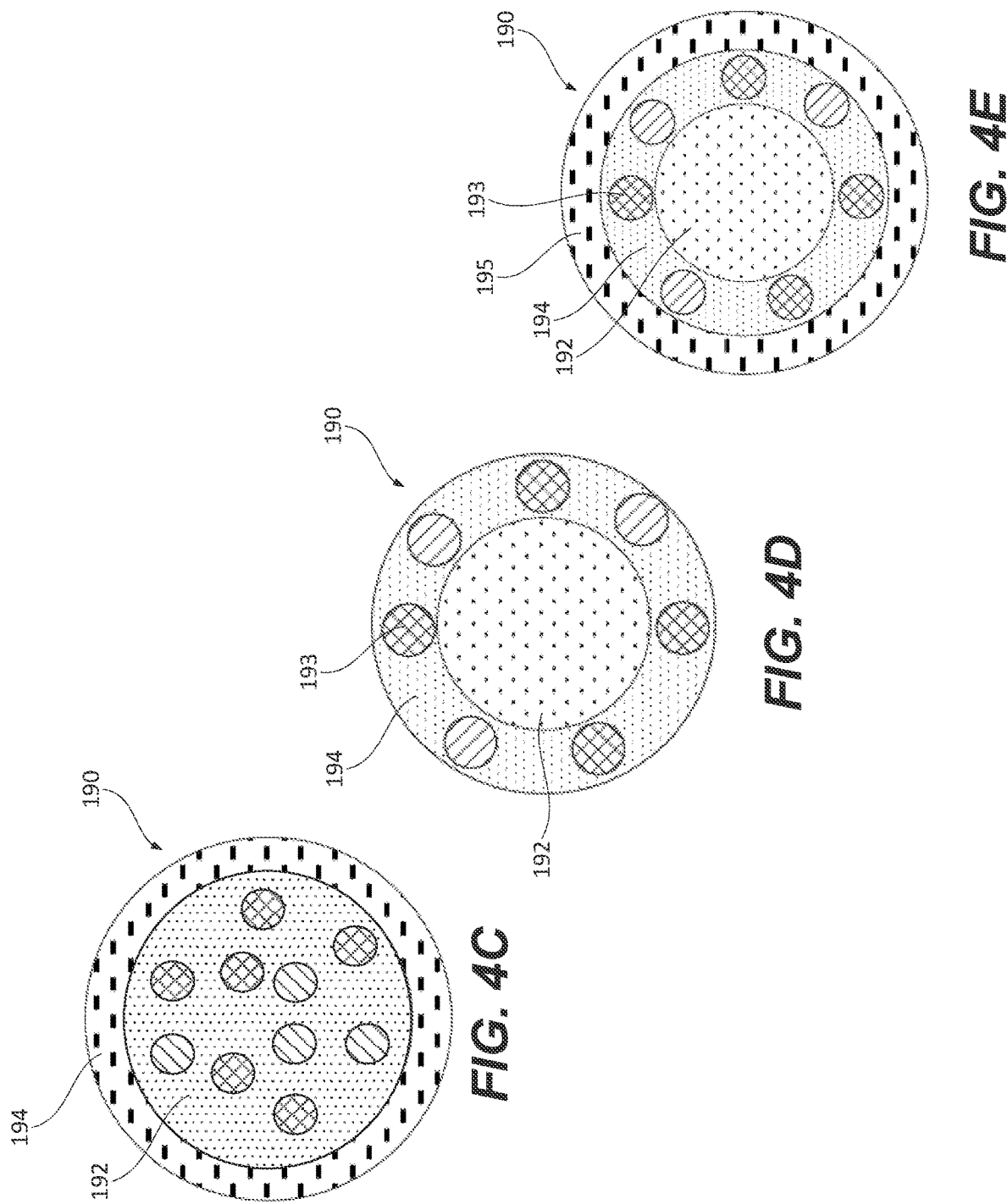

MULTIPLEXED IMPEDANCE-BASED DETECTION METHODS AND SYSTEMS USING IMPEDANCE-ENCODED PARTICLES

BACKGROUND

Functionalized particles are used for various applications, such as detecting specific analytes in solutions. These particles have specific functional groups, either on their surfaces or throughout the particle matrix, e.g., in open-structure particles or gel-matrix particles. Conventional methods of encoding functionalized particles for suspension arrays are often based on adding special compounds to provide unique luminescent responses, distinguishing physical shapes, imaging-based feature encoding, molecular encoding (e.g., DNA), and the like.

Luminescence encoding involves both fluorescence encoding (short-lived excited states) and phosphorescence encoding (long-lived excited states). For example, fluorescence encoding is often used in flow cytometric methods. However, these conventional methods have various problems. One of these problems is spectral interference with the analyte fluorescence signal. This interference often requires multiple excitation wavelengths and emission bands to successfully separate the signals, which limits the number and type of fluorophores for measuring the analyte concentration. Furthermore, this interference increases the complexity of imaging systems and software needed to deconvolve the captured response signals.

Phosphorescence encoding typically uses lanthanides or other materials, which exhibit very long-lived excited states. Phosphorescence methods often require multiple excitation wavelengths (e.g., in the deep ultraviolet range) to excite lanthanides or time-gated detection to separate analyte fluorescence from encoding phosphorescence (e.g., when phosphorescent materials are excited at the same wavelengths as the analyte). Furthermore, due to the long emission lifetimes, the implementation of high-speed systems (e.g., flow cytometers) is challenging. Phosphorescence-based methods typically require microscopic imaging of a fixed bed of particles, which increases cost, complexity, and time.

Other emissive techniques (e.g., surface-enhanced Raman spectroscopy) for encoding particles have similar drawbacks and limitations to luminescence encoding. Furthermore, some of these other emissive techniques often have additional disadvantages (e.g., being more difficult to manufacture).

Colorimetric approaches of encoding microparticles use sub-particles composed of an opal photonic crystal or other such structures. These approaches don't interfere with the fluorescence signal of the labeled analyte but require a rather complex approach to decode them (i.e., precise color identification). These approaches typically have a relatively limited encoding capacity since the larger particle sizes limit their multiplexing capacity. Furthermore, these approaches are typically more difficult to manufacture than luminescent particles.

The size-based encoding uses particles with varying physical sizes, typically in the range of 5 micrometers to 100 micrometers. The major drawback of this size-based encoding method is that the varying surface area and volume of each particle results in varying degrees of functional groups incorporated throughout or on the surface of the particle. These variations can cause various undesirable interferences.

Feature-based particle encoding uses unique shapes or symbols, similar to a bar-code, that can be decoded by acquiring images of each particle and decoding them using automated image analysis. While features can easily create enormous code spaces, they require micro-imaging every particle and subsequently applying feature recognition software routines, which limits fast on-the-fly decoding, requires more intensive computing resources, and greatly complicates flow-cytometric implementations.

Capacitive encoding is another approach, which addresses some of these luminescent encoding issues. However, capacitive encoding is specifically limited to the capacitive part of the complex impedance. In general, complex impedance includes resistive, inductive, and capacitive components. Furthermore, existing capacitive encoding techniques are slow and costly, requiring the coating of a single side of the beads with a conductor. Capacitive encoding techniques also complicate the ability to functionalize the entire bead surface. This limitation presents various challenges for a rapid measurement method, which also analyzes the fluorescence signal of an analyte since the light is blocked or otherwise affected on the half of the particle.

What is needed are new methods and systems for uniquely encoding different types of particles as well as new methods and systems to decode each type of encoded particle in a fast and efficient manner.

SUMMARY

Described herein are multiplexed impedance-based detection methods for identifying each type of impedance-encoded particles. Also described are systems for performing these methods. Impedance-encoded particles of each type comprise cores having the same structure. As such, all particles of the same type produce the same complex electrical impedance signature, when an AC signal is applied to these particles. At the same time, different types of particles have different core structures and produce different complex electrical impedance signatures. These signature differences allow differentiating different types of particles. In some examples, different types of particles have different functionalization, resulting in different analytes binding to or otherwise reacting with these particles. As such, these particles may be arranged into the same test media to detect different analytes. The analytes are detected and differentiated based on identifying each type of impedance-encoded particles using complex electrical impedance signatures. Furthermore, the multiplexed impedance-based detection system may include an optical detector to determine the concentration of these analytes. In further examples, the system includes a sorter to separate the different particles so that each analyte may be individually quantified by other means.

In some examples, a multiplexed impedance-based detection method for identifying each type of impedance-encoded particles using a multiplexed impedance-based detection system is provided. The method comprises flowing a test suspension, comprising the impedance-encoded particles, through the multiplexed impedance-based detection system, comprising an AC-impedance detector. The method also comprises applying an AC signal to electrodes of the AC-impedance detector and obtaining complex electrical impedance reading from the electrodes as the test suspension flows between the electrodes of the AC-impedance detector. Finally, the method comprises identifying each type of the impedance-encoded particles based on the complex electrical impedance reading, obtained from the electrodes of the AC-impedance detector.

In some examples, each type of the impedance-encoded particles has a unique functionalization, configured to bind to or react with a different type of analytes. For example, identifying each type of the impedance-encoded particles comprises identifying each of the analytes. In some examples, the method further comprises, while flowing the test suspension through the multiplexed impedance-based detection system, optically quantifying a concentration of each of the analytes.

In some examples, the AC signal applied to the electrodes comprises multiple AC sub-signals having different frequencies. For example, the multiple AC sub-signals are applied concurrently. In other examples, the multiple AC sub-signals are applied sequentially or as a frequency sweep.

In some examples, the multiplexed impedance-based detection system comprises a microfluidic flow channel such that the test suspension is flown through the microfluidic flow channel.

Also provided is a multiplexed impedance-based test media for a multiplexed impedance-based detection method. In some examples, the test media comprises a first impedance-encoded type and a second impedance-encoded type of impedance-encoded particles, wherein each of the impedance-encoded particles comprises. The media also comprises a particle core, wherein the particle core of the first impedance-encoded type and the particle core of the second impedance-encoded type has different characteristics resulting in different complex electrical impedance signatures produced by each of the first impedance-encoded type and the second impedance-encoded type subjected to an AC signal.

In some examples, each of the impedance-encoded particles comprises a functionalization component, such that the functionalization component of the first type and the functionalization component of the second type are configured to bind to or react with different analytes.

In some examples, the different characteristics of the particle core of the first impedance-encoded type and the particle core of the second impedance-encoded type are different material compositions. In the same or other examples, the different characteristics of the particle core of the first impedance-encoded type and the particle core of the second impedance-encoded type are different numbers of core-forming nanoparticles. In further examples, the different characteristics of the particle core of the first impedance-encoded type and the particle core of the second impedance-encoded type are different sizes of the particle core.

In some examples, the particle core is formed from a metal. In the same or other examples, each of the impedance-encoded particles further comprises a particle shell, surrounding the particle core and protecting the particle core from environment. For example, the particle shell is formed poly(ethylene glycol).

In some examples, each of the impedance-encoded particles further comprises a particle shell, which contains core-forming sub-particles, surrounding the particle core. For example, each of the impedance-encoded particles further comprises a second particle shell, surrounding the particle shell and the particle core.

In some examples, a multiplexed impedance-based detection system for identifying each type of impedance-encoded particles. The multiplexed impedance-based detection system comprises a flow channel, configured to enclose a test suspension, comprising the impedance-encoded particles, while the test suspension flows through the multiplexed impedance-based detection system. The multiplexed impedance-based detection system also comprises an AC-impedance detector, comprising electrodes and a power supply. The electrodes are mechanically coupled to the flow channel. The power supply is electrically coupled to the electrodes and configured to deliver an AC signal to the electrodes, to obtain complex electrical impedance signatures from the electrodes, and to identify each type of the impedance-encoded particle based on its complex electrical impedance signature.

In some examples, the multiplexed impedance-based detection system further comprises an optical detector configured to measure luminescent or colorimetric properties of the impedance-encoded particles. In the same or other examples, the multiplexed impedance-based detection system further comprises a particle sorter configured to sort the impedance-encoded particle based on electrical impedance signatures of the impedance-encoded particle.

BRIEF DESCRIPTION OF THE DRAWINGS

FIGS. 4A-4E are schematic illustrations of different examples of impedance-encoded particles, configured to produce different complex electrical impedance signatures.

DETAILED DESCRIPTION

Figure 1:
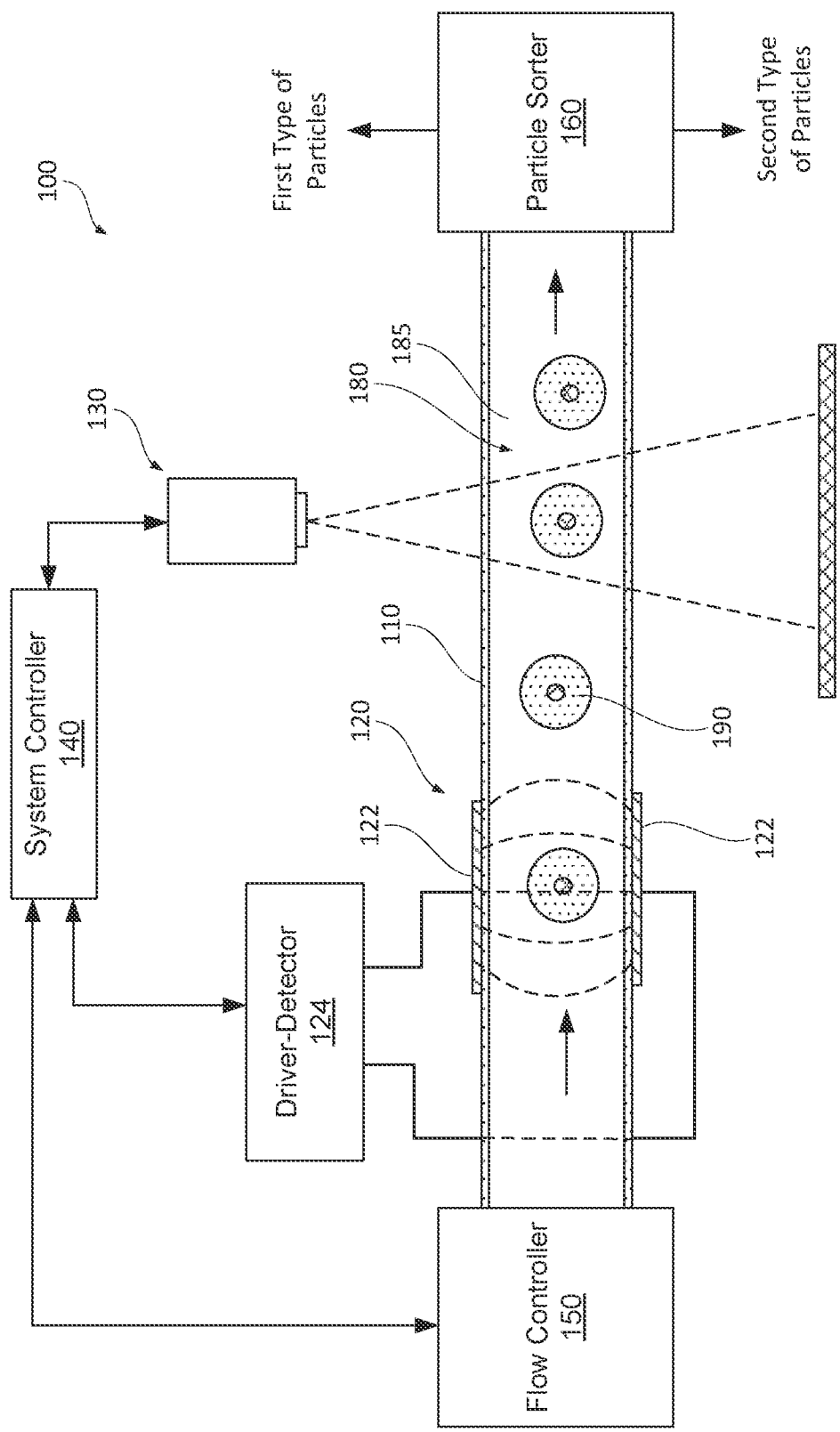
FIG. 1 is a schematic illustration of a multiplexed impedance-based detection system for identifying each type of impedance-encoded particles based on complex electrical impedance signatures of these particles, in accordance with some examples.

In the following description, numerous specific details are outlined to provide a thorough understanding of the presented concepts. In some examples, the presented concepts are practiced without some or all of these specific details. In other instances, well-known process operations have not been described in detail so as not to unnecessarily obscure the described concepts. While some concepts will be described in conjunction with the specific examples, it will be understood that these examples are not intended to be limiting.

INTRODUCTION

Multiplexed detection methods employ multi-analyte assays such that each assay allows parallel probing of multiple analytes in the same small volume. These characteristics (i.e., multiple analytes and small volumes) help to accelerate the pace of scientific discovery or, more specifically, assay processing, disease and/or other biological detection and quantification, and other like tasks. A specific example of these methods is a particle-based multiplexed suspension array, in which particles, supporting different probes or sensors, are dispersed in the same assay. This particle-based detection/quantification has many additional benefits, such as near solution-phase kinetics, many-fold inter-sample replicates, and the ability to directly synthesize molecules (e.g., molecular sensors) onto the particles using solid-phase synthesis (SPS). Because particles are not fixed in space (like micro-arrays), these suspended particles need internal identifications, which may be referred to as encoding. Various distinctive particle characteristics may be used for the encoding or, more specifically, for the identification of different particle types. Each particle type has a unique distinctive characteristic, attributed to only this particle type. As such, different particle types have different characteristics. Detecting and differentiating these characteristics allow the decoding of different particle types. For example, conventional multiplexed detection methods rely on distinctive optical characteristics, which have various drawbacks described above.

Methods and systems, described herein, use complex electrical impedance signatures as distinguishing characteristics. As such, these methods may be referred to as multiplexed impedance-based detection methods, while the system may be referred to as multiplexed impedance-based detection systems. Also described herein are impedance-encoded particles used with these methods and systems. Each type of impedance-encoded particle has a unique complex electrical impedance signature, specifically identifying each type of these particles. It should be noted that complex electrical impedance signatures depend on decoding techniques and, more specifically, on AC signals applied to electrodes while the impedance-encoded particles pass between or by these electrodes. For example, electrodes may be used in a planar configuration such that particles passing by can have their AC impedance measured. Various examples of AC signals can be used and described herein for the precise decoding of the particles.

In some examples, each impedance-encoded particle comprises a core, formed by one or more core-forming sub-particles. When the core is formed by multiple core-forming sub-particles, these particles may be aggregated together (e.g., in the center of the impedance-encoded particle) or be separated (e.g., distributed through the entire volume of the impedance-encoded particle). The type and structures of the core define a complex electrical impedance signature of the impedance-encoded particle. For example, different types of impedance-encoded particles may have different compositions of their cores and/or different sizes of their cores (e.g., different number of core-forming sub-particles and/or a different arrangement of core-forming sub-particles and/or different core-forming sub-particle compositions). In some examples, the core is surrounded by a second shell layer. For example, the second shell layer has a different composition from the core. In some examples, this second shell comprises sub-particles. Furthermore, in some examples, the second shell layer surrounds the first shell and the core and is free from sub-particles.

In some examples, different types of impedance-encoded particles have different functionalization, resulting in different analytes being able to bind to or otherwise react with the different particle types. As such, these particles may be arranged into a test media (e.g., a test suspension) to detect different analytes by decoding these particles. More specifically, each analyte is detected by identifying a particle type based on the corresponding complex electrical impedance signature. Furthermore, a multiplexed impedance-based detection system may include an optical detector to determine the concentration of these analytes. This analyte identification and concentration measurement may be performed in the same system, e.g., comprising a flow channel, an AC-impedance detector functionally coupled to the flow channel and configured to obtain complex electrical impedance signatures, and an optical detector configured to test the suspension within the channel. In some examples, the particles are sorted based on the particles' type after identification for analysis by other techniques or instruments, either external or internal to the same system.

As such, a large number of differently-functionalized particles may be pooled together and incubated with a test sample, collectively forming a test suspension. Afterward, the test suspension is flown through a multiplexed impedance-based detection system, and each type of particle is identified/decoded using its unique complex electrical impedance signature. This particle decoding also identifies a corresponding analyte to this particle type.

Overall, multiplexed impedance-based detection methods and systems are based on three unique aspects. The first aspect involves impedance-encoded particles, which may be uniquely functionalized for each particle type. The encoding is based on the complex electrical impedance signature, In some examples, encoded particles are specifically configured/encoded to achieve specific electrical impedance signatures. These particles are flown through a multiplexed impedance-based detection system as a part of a suspension allowing single-step and single-volume multi-analyte detection. For example, small molecules (e.g., amino acids and PAHs) and large molecules (e.g., proteins, DNA/RNA) may be detected and quantified using this approach. It should be specifically noted that these multiplexed impedance-based detection methods and systems go beyond the conventional binary approach (e.g., present-not present) and enable the measurement/quantification of the amounts of analytes (e.g., to quantify the concentration of each analyte in an assay).

The second aspect involves impedance encoding of the particles. More specifically, the particles are fabricated with different impedance characteristics (e.g., different types of materials forming various components of these particles, different sizes, etc.). These characteristics are identifiable using a multiplexed impedance-based detection and measurement system. Each particle type has the same impedance encoding, which is evidenced by the same complex impedance signature (e.g., obtained across multiple frequencies).

The third aspect involves different functionalization of different particle types. Each particle type may be functionalized in the same way (e.g., using the same probe), but different particle types may have different functionalization. Different types of particles are combined in the same assay. The different functionalization enables the capture and/or detection and/or quantification of different analytes.

Examples of Multiplexed Impedance-Based Detection Systems

Referring to FIG. 1, multiplexed impedance-based detection system 100 comprises flow channel 110, which may be referred to as a flow cell. Flow channel 110 provides a path for test suspension 180 through multiplexed impedance-based detection system 100. Test suspension 180 comprises fluid 185 and impedance-encoded particles 190. Each type of impedance-encoded particles 190 is uniquely identified in multiplexed impedance-based detection system 100. In some examples, impedance-encoded particles 190 are hydrodynamically-focused to flow through the center of flow channel 110 one at a time (e.g., in a "single file") using methods that may include sheath flow or acoustic-assisted focusing. In some examples, flow channel 110 is manufactured from glass, plastics, crystal structures, and other like materials. The cross-sectional size of flow channel 110 may be between 25 micrometers and 170 micrometers, though other sizes are within the scope.

In some examples, multiplexed impedance-based detection system 100 comprises flow controller 150, comprising one or more pumps. A pressure-driven flow control is also within the scope. Flow controller 150 may be positioned at the inlet of flow channel 110 and control the flow rate of test suspension 180 through flow channel 110. In some examples, flow controller 150 is configured to focus impedance-encoded particles 190 to the center of flow channel 110, as referenced above, and even space them apart to ensure that only one particle is being analyzed at a given time.

Multiplexed impedance-based detection system 100 also comprises AC-impedance detector 120 and, in some examples, optical detector 130. AC-impedance detector 120 is configured to decode impedance-encoded particles 190 in test suspension 180 or, more specifically, to identify each type of impedance-encoded particles 190 as these particles are carried by fluid 185 (within test suspension 180) through AC-impedance detector 120.

In some examples, AC-impedance detector 120 comprises electrodes 122 and driver-detector 124. Electrodes 122 are functionally coupled to flow channel 110 and, in some examples, mechanically coupled to flow channel 110. For example, electrodes 122 may be positioned inside flow channel 110 (e.g., attached to the internal wall surface of flow channel 110) and in contact with fluid 185. Alternatively, electrodes 122 are positioned outside of flow channel 110 (e.g., attached to the external wall surface of flow channel 110) as, for example, is shown in FIG. 1. In some examples, the electrode spacing is determined by the internal size of flow channel 110 (e.g., when electrodes 122 are positioned within flow channel 110) or by both the internal size of flow channel 110 and the wall thickness (e.g., when electrodes 122 are positioned outside flow channel 110). In specific examples, the electrode spacing is between 10 micrometers and 200 micrometers or, more specifically, between 25 micrometers and 100 micrometers. Overall, the electrode spacing depends, in part, on the size of impedance-encoded particles 190. In some examples, electrodes 122 are formed from platinum. However, other suitable conductive metals are also within the scope, e.g., especially for external applications. In some examples, electrodes 122 comprise two sets of electrode pairs. In some examples, electrodes 122 are arranged in a planar configuration.

Driver-detector 124 is configured to apply an AC signal to electrodes 122 and also to obtain complex electrical impedance measurements from electrodes 122, e.g., as test suspension 180 flows between electrodes 122. In some examples, the complex electrical impedance reading is obtained continuously, and specific complex electrical impedance signatures are identified from this continuous reading. Various examples of these readings are shown in FIGS. 6A-6D and described below. Driver-detector 124 measures the complex electrical impedance at one or more frequencies. In some examples, driver-detector 124 comprises a multi-channel lock-in detector, configured to simultaneously measure multiple frequencies.

In some examples, decoding of impedance-encoded particles 190 is performed by driver-detector 124 using, e.g., field-programmable gate arrays (FPGAs) or digital logic processors for high-speed identification. Alternatively, decoding is performed using the software, e.g., available at system controller 140 or even as part of a post-processing data analysis (e.g., external to multiplexed impedance-based detection system 100).

In some examples, multiplexed impedance-based detection system 100 comprises system controller 140, which is configured to control various components of multiplexed impedance-based detection system 100 and is also configured to receive feedback from these components. For example, system controller 140 may be communicatively coupled to flow controller 150 to control the flow rate of test suspension 180 through flow channel 110. For example, system controller 140 may also be communicatively coupled to AC-impedance detector 120, e.g., to receive the complex electrical impedance readings and to identify each type of impedance-encoded particles 190 based on these complex electrical impedance readings. For example, system controller 140 may have a database or trained neural network of different complex electrical impedance signatures corresponding to different types of impedance-encoded particles 190. System controller 140 compares these impedance signatures to the impedance readings and determines if a particle of a given particle type passed between electrodes 122 (e.g., at a particle time frame). In some examples, system controller 140 correlates complex electrical impedance readings from driver-detector 124 with other system information (e.g., data from optical detector 130). This aggregated data is saved for post-processing on another system, equipped with software that could decode the impedance-encoded particles 190.

In some examples, multiplexed impedance-based detection system 100 comprises optical detector 130, such as a fluorescent detector. Optical detector 130 may be configured to quantify the target analytes, attached to or having reacted with each type of impedance-encoded particle 190. In some examples, optical detection is based on luminescence, where the analytes are either natively luminescent or labeled with a luminescent compound such that the level of luminescence indicates the amount of analyte present in or on the particle. Alternatively, analytes may compete for sites on the impedance-encoded particles 190 with luminescent compounds such that the level of luminescence indicates the amount of analyte present in or on the particle. Alternatively, impedance-encoded particles 190 are made to react to analytes such that impedance-encoded particles 190 become luminescent or subsequentially become bound to a luminescent compound. Also, in this case, the amount of luminescence indicates the amount of analyte that had reacted with impedance-encoded particles 190. For luminescence measurements, optical detector 130 comprises a luminescence excitation source and a detector. The luminescence excitation source is a laser, a light-emitting diode, a super-luminescent diode, or a filtered portion of a multispectral source, such as an arc lamp or incandescent lamp. The luminescence detector comprises one or more of a photodiode, a charged coupled device, a CMOS detector, a silicon photodiode, an avalanche photodiode, a photomultiplier tube, a phototube, and/or other light-sensitive devices. In some examples, the luminescence detector includes means for specifying the spectral band of detection. Some examples include a long-pass optical filter, a short-pass optical filter, a single-band bandpass filter, a multi-band bandpass filter, a continuous-band filter, dichroic mirrors, and/or spectrometers based on any combination of gratings, prisms, or arrays of optical filters. In some examples, the luminescence detector can reject the light from the excitation source using a wavelength-selecting device, which includes any combination of filters, gratings, or prisms listed above.

In some examples, multiplexed impedance-based detection system 100 comprises particle sorter 160, configured for post-characterization sorting of impedance-encoded particles 190. The impedance-encoded particles 190 could then be analyzed in other systems, which could be integrated into multiplexed impedance-based detection system 100. For example, the output of driver-detector 124, controller 140, or another system is used for subsequent down-stream sorting of impedance-encoded particles 190 based on particle types. In some examples, this sorting occurs after optical detection by optical detector 130.

Overall, in some examples, multiplexed impedance-based detection system 100 allows simultaneous analysis (in the same pass) of test suspension 180 for (1) specific analyte types and (2) quantity of the identified analytes. The specific analyte types are determined based on the identification of specific types of impedance-encoded particles 190 using AC-impedance detector 120. The quantity of the identified analytes is determined using optical detector 130.

Unlike conventional optically-encoded identification of analytes, this AC impedance spectroscopy does not have cross-talk or interference between impedance-encoded particles 190 and the optical detection of analytes.

Examples of Impedance-Encoded Particles and Multiplexed Impedance-Based Test Media Different types of impedance-encoded particles 190 may be arranged into multiplexed impedance-based test media 199. Multiplexed impedance-based test media 199 is then used to form test suspension 180 as further described below with reference to FIG. 5.

Figure 2:
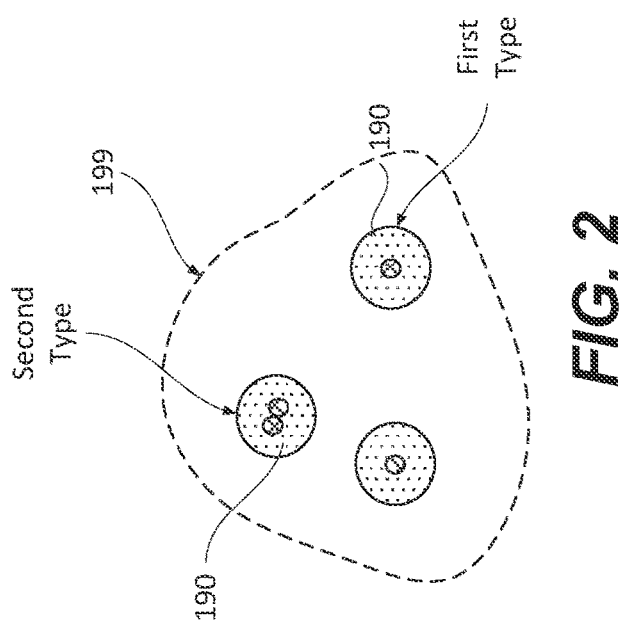
FIG. 2 is a schematic illustration of a test media, comprising different impedance-encoded types of particles, configured to produce different complex electrical impedance signatures, in accordance with some examples.

FIG. 2 is a schematic illustration of multiplexed impedance-based test media 199, comprising two types of impedance-encoded particles 190. Specifically, multiplexed impedance-based test media 199 comprise a first impedance-encoded type and a second impedance-encoded type of impedance-encoded particles 190. As further described below with reference to FIGS. 3 and 4A-4E, each of impedance-encoded particles 190 comprises particle core 192. However, particle core 192 of first impedance-encoded type and particle core 192 of the second impedance-encoded type have different characteristics, resulting in different complex electrical impedance signatures produced by each type when subjected to an AC signal.

While FIG. 2 illustrates multiplexed impedance-based test media 199 with two types of impedance-encoded particles 190, one having ordinary skill in the art would understand that any number of different particle types may be used in the same multiplexed impedance-based test media 199, e.g., three, four, five, and so on. The number of different particle types depends on the test needs (e.g., the number of different analytes) and capabilities of multiplexed impedance-based detection system 100 (e.g., ability to differentiate complex electrical impedance signatures of multiple different particle types).

It should be noted that impedance-encoded particles 190 are not bound to specific locations in multiplexed impedance-based test media 199, unlike in multiplexed arrays. As such, impedance-encoded particles 190 are free to move within multiplexed impedance-based test media 199 and within test suspension 180 formed using multiplexed impedance-based test media 199.

FIGS. 3 and 4A-4E illustrate different examples of impedance-encoded particles 190. Each impedance-encoded particle 190 comprises particle core 192, which uniquely defines the complex electrical impedance signature of this particle. Suitable materials for particle core 192 include, but are not limited to, conductors, such as metals (e.g., gold), which provide differentiation based on resistive and capacitive components of complex electrical impedance. Other suitable materials for particle core 192 include, but are not limited to, semiconductors, polarizable molecules (providing a capacitive component), magnetic particles (providing an inductive component), semiconductors, and insulator materials.

Figure 3:
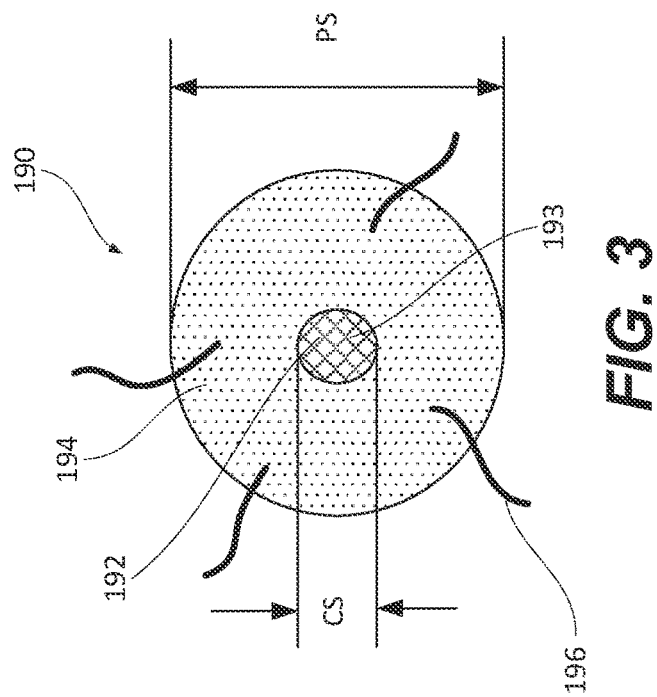
FIG. 3 is a schematic illustration of an impedance-encoded particle, configured to produce different complex electrical impedance signatures, in accordance with some examples.

The unique complex electrical impedance signatures of particle core 190 is achieved through a unique composition, size, and/or structure of particle core 192. For example, FIG. 3 illustrates particle core 192 formed by a single core-forming sub-particle 193. Different particle sizes and/or compositions may be used to create different complex electrical impedance signatures.

Figure 4A:
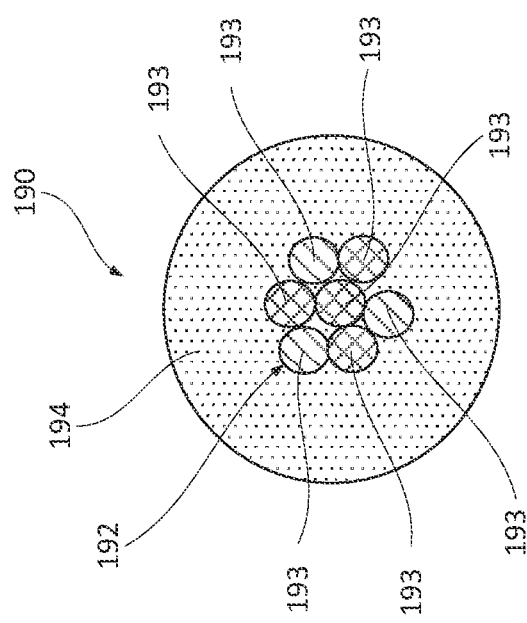
Figure 4B:
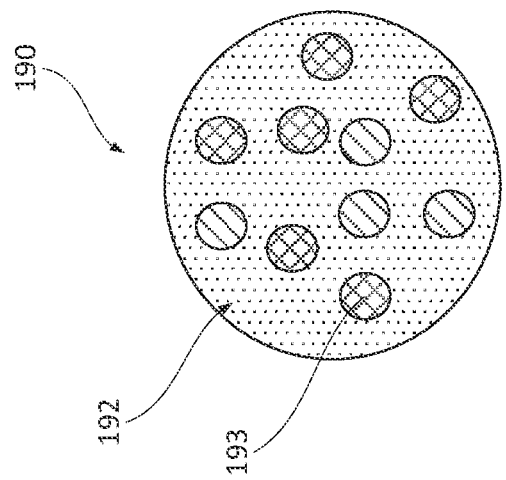

FIGS. 4A and 4B illustrate examples of particle core 192 formed by multiple core-forming sub-particles 193. These sub-particles may be the same (e.g., the same size and the same composition) or different (e.g., different sizes and/or compositions). These characteristics, in addition to the number of different core-forming sub-particles 193 and/or different locations of core-forming sub-particles 193 within particle core 192, may be used to create different complex electrical impedance signatures.

Referring to FIG. 4A, multiple core-forming sub-particles 193 are aggregated together. FIG. 4B illustrates an example where core-forming sub-particles 193 are distributed through the entire volume of impedance-encoded particle 190. This example may be referred to as a distributed core. The example in FIG. 4A may be referred to as a compact core. The distribution of core-forming sub-particles 193 within impedance-encoded particle 190 may be uniform or clustered. Varying this distribution may be used to produce different complex electrical impedance signatures and/or to enhance the optical properties of impedance-encoded particle 190.

Referring to FIG. 4C, impedance-encoded particle 190 comprises particle core 192, surrounded by particle shell 194. In some examples, the material composition of particle shell 194 is different from that of particle core 192. For example, FIG. 4C illustrates a distributed core, but the core may also be compact. FIG. 4D shows an example of impedance-encoded particle 190 with sub-particles 193, located entirely in particle shell 194. In this example, sub-particles 193 may be referred to as shell-forming sub-particles. FIG. 4E shows an example of impedance-encoded particle 190 with secondary shell layer 195. The material composition of secondary shell layer 195 is the same or different from particle shell 194 and/or particle core 192. Other examples of impedance-encoded particle 190 are also within the scope. One having ordinary skill in the art would understand that any combination or variations of the examples described above can be used. For example, particle core 192 in FIG. 4D may comprise core-forming sub-particles, either compacted or distributed. These additional examples may be configured based on specific manufacturing considerations, such as reactions or handling requirements of different core-forming sub-particles. Other considerations include enhancement of the complex impedance signals generated by impedance-encoded particles 190 through the geometric distribution of core-forming sub-particles; providing a boundary layer around a particle, possibly to enhance functionalization or robustness of the particle to conditions that may exist in the suspension array which may include a need for enhanced solvent resistance or enhanced hydrophobicity or hydrophilicity.

Referring to FIG. 3, in some examples, each impedance-encoded particle 190 comprises particle shell 194. For example, particle shell 194 is formed from one or more of poly(ethylene glycol) (PEG) hydrogel, polyethylenes, polystyrenes, polypropylenes, polymethyl methacrylate (PMMA), and nylon. Specifically, a PEG hydrogel is highly durable in various environments of test suspension 180 thereby allowing novel materials used in test suspension 180.

Referring to FIG. 3, in some examples, the overall particle size (shown as "PS" in FIG. 3) of each impedance-encoded particle is between 10 micrometers and 100 micrometers or, more specifically, between 30 micrometers and 60 micrometers. Specifically, impedance-encoded particles 190 need to remain in suspension 180 and need to get pulled around with a laminar flow in flow channel 110. If impedance-encoded particles 190 are too large, this flow control is difficult. However, if impedance-encoded particles 190 are too small, the detection of impedance-encoded particles 190 becomes challenging.

In some examples, each type of impedance-encoded particles 190 is functionalized in a different way. In these examples, each particle type acts as a probe for a different small molecule or class of small molecules. For example, impedance-encoded particles 190 are functionalized using various types of links, such as Thiol-Michael addition. In this example, an acrylate group on a PEGda-based bead can link any molecule containing a thiol (SH) group, such as amine, carboxyl, or carbon chain groups (e.g., C18). This functionalization happens right on (or in) the particles, which makes it possible to easily wash away and replace reaction chemicals using SPS methods.

Additionally, after adding on the appropriate chemical group to the surface or interior type of impedance-encoded particles 190, other probes can be coupled to this group. Some examples of the probes include, but are not limited to, hapten-selective antibodies, which are selective for small molecules, such as certain amino acids or PAHs (anti-Alanine, anti-Glycine, anti-Glutamine from Abcam; anti-PAHs from Santa Cruz Biotechnology), genetic encoded Förster resonance energy transfer (FRET) sensors (which can be produced in cell lines), and/or fluorescent chemosensors (also called molecular sensors).

In some examples, a Molecularly Imprinted Polymer (MIP) is used for the preparation of synthetic polymers with predetermined specificity, which is used for impedance-encoded particles 190, e.g., as particle shell 194. For example, functional monomers are copolymerized with crosslinkers in the presence of the target molecule. This method can be directly used with functional PEG monomers while fabricating impedance-encoded particles 190. Among other things, they can be used for chiral detection of molecules, sensors, antibody-mimicking, and enzyme-like catalysts. In some examples, viruses, bacteria or other pathogens, or particles thereof, are attached to detect the presence of antibodies against those viruses or bacteria in samples. In some examples, DNA or RNA is attached to detect complementary DNA or RNA. In other cases, target analytes compete for binding sites on impedance-encoded particles 190 with luminescent molecules. In other cases, impedance-encoded particles 190 are functionalized in such a way that impedance-encoded particles 190 react with a target analyte, changing characteristics of impedance-encoded particles 190 These characteristics are then quantified. For example, the impedance-encoded particles 190 change the color, become luminescence, and/or allow impedance-encoded particles 190 to bind to a luminescent molecule. In some examples, solid-phase materials for molecular extraction are attached to the particles to facilitate the extraction of analytes.

Examples of Multiplexed Impedance-Based Detection Methods

Figure 5:
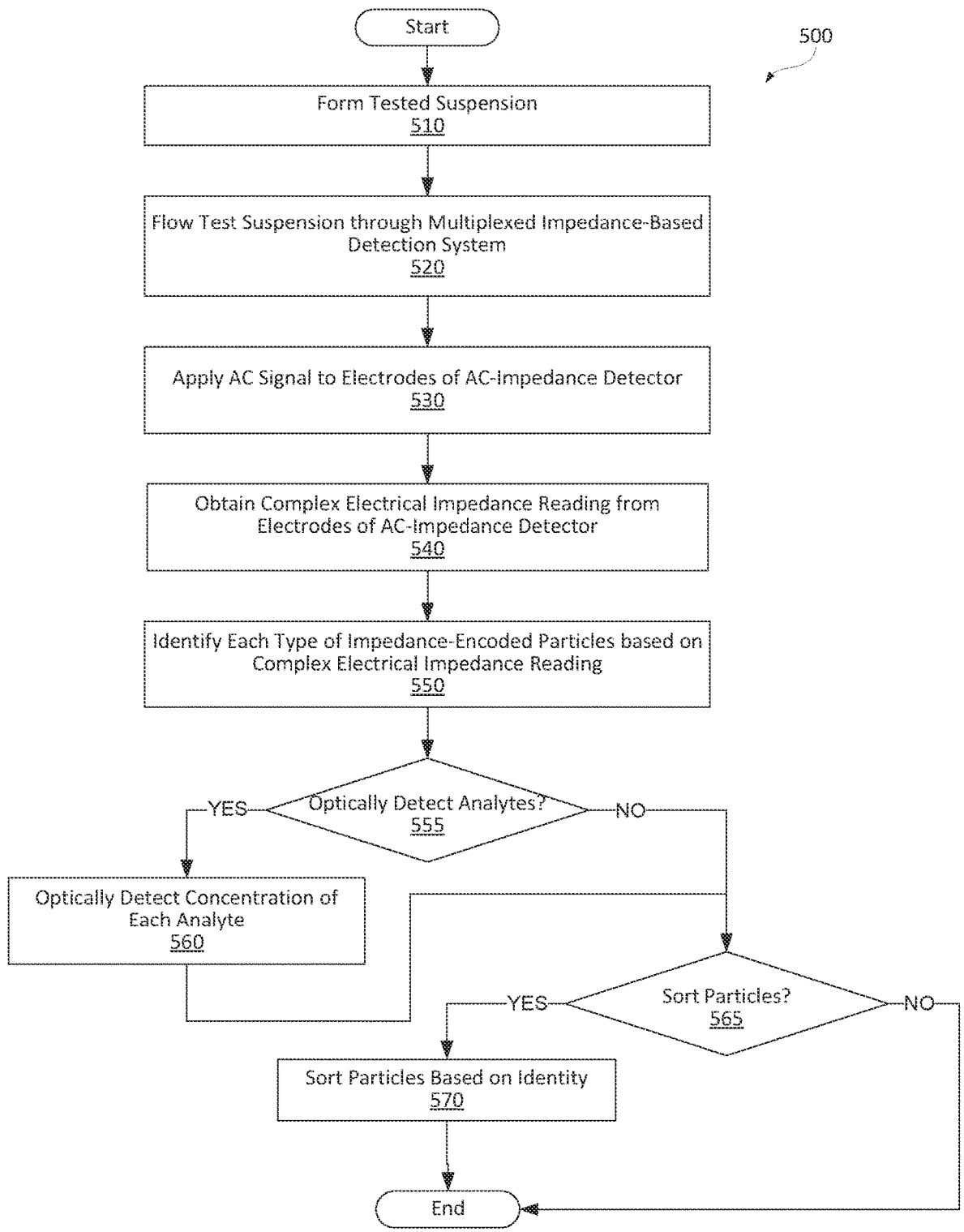
FIG. 5 is a process flowchart corresponding to a multiplexed impedance-based detection method for identifying each type of impedance-encoded particles, in accordance with some examples.
Figure 6A:
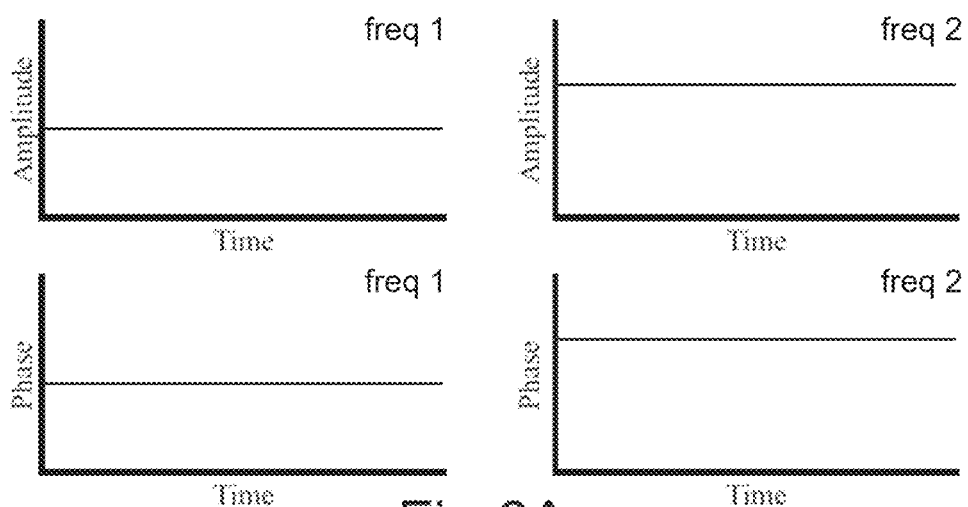
FIGS. 6A-6D are examples of complex electrical impedance signatures for different types of impedance-encoded particles.
Figure 6B:
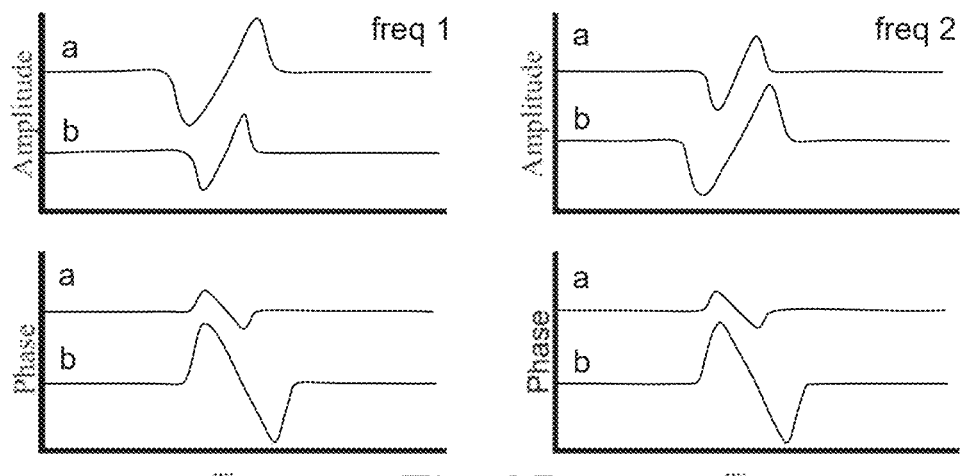
Figure 6C:
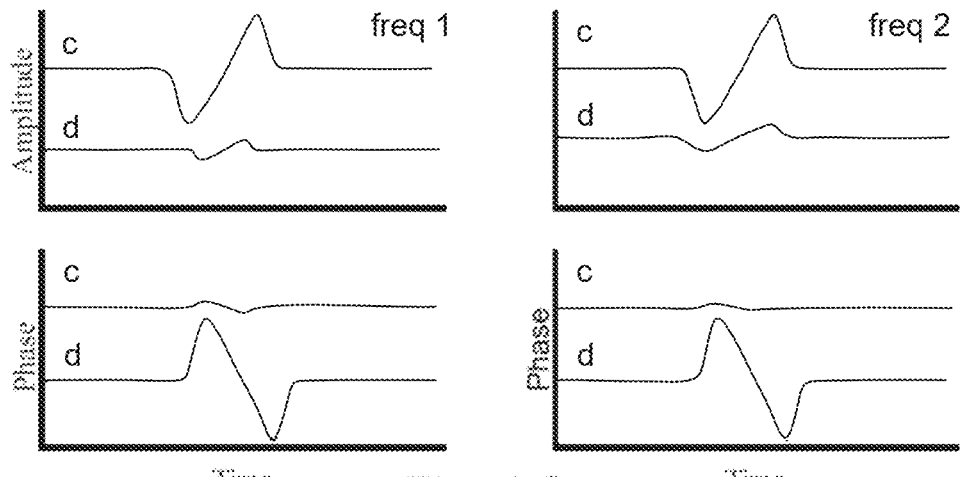
Figure 6D:
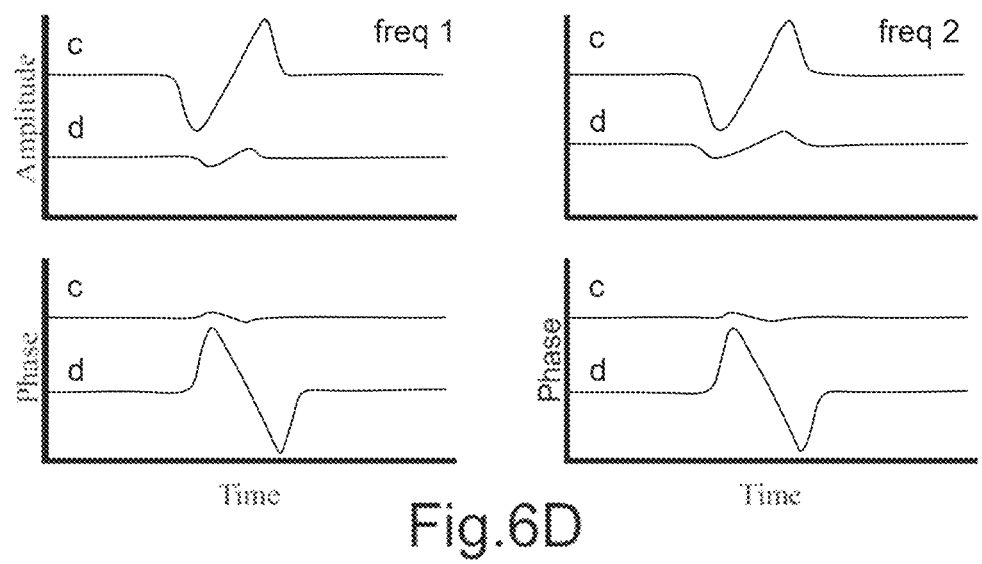

FIG. 5 is a process flowchart corresponding to multiplexed impedance-based detection method 500 for identifying each type of impedance-encoded particles 190, in accordance with some examples. Method 500 is performed using multiplexed impedance-based detection system 100, various examples of which are described above. Furthermore, various examples of impedance-encoded particles 190 are described above.

In some examples, method 500 comprises forming (block 510) test suspension 180 by combining impedance-encoded particles 190 with analytes. This operation is performed before flowing test suspension 180 through multiplexed impedance-based detection system 100, which is described below. Once impedance-encoded particles 190 are combined with analytes, different types of analytes may bind with different types of impedance-encoded particles 190, e.g., due to different functionalization of these different types of impedance-encoded particles 190. Various techniques to assist with this binding are within the scope.

In some examples, method 500 comprises flowing (block 520) test suspension 180 through multiplexed impedance-based detection system 100. As noted above, test suspension 180 comprises impedance-encoded particles 190 and suspension fluid 185, such as a buffer with well-characterized electrical impedance. Test suspension 180 also includes the analytes, which are selectively bound to different types of impedance-encoded particles 190 as described above. In some examples, a sheath flow fluid, which may be the same buffer, may be combined with test suspension 180 in flow controller 150 to keep impedance-encoded particles 190 centered in flow channel 110 and/or spaced apart from one another.

In some examples, multiplexed impedance-based detection system 100 comprises a microfluidic flow channel 110 such that test suspension 180 is flown through microfluidic flow channel 110. More specifically, microfluidic flow channel 110 may limit the number of impedance-encoded particles 190 positioned at any time between electrodes 122 of AC-impedance detector 120. A flow-focusing mechanism may also be present as part of flow controller 150. The flow-focusing mechanism may use a sheath flow to center and space impedance-encoded particles 190 to ensure that only one particle enters a sensing region (e.g., between electrodes 122) or an optical detection region at a time. This feature is controlled by the rate of sheath flow to that of the tested suspension while the sheath fluid and the suspension are mixed together in flow controller 150.

Various examples of multiplexed impedance-based detection system 100 are described above with reference to FIG. 1. For example, multiplexed impedance-based detection system 100 comprises AC-impedance detector 120, comprising electrodes 122. Multiplexed impedance-based detection system 100 comprises flow channel 110.

In some examples, method 500 comprises applying (block 530) an AC signal to electrodes 122 of AC-impedance detector 120. For example, the applied AC signal comprises multiple AC sub-signals having different frequencies, e.g., two different frequencies, three different frequencies, four different frequencies, and so on. Complex impedance is typically frequency-dependent. For example, inductance and capacitance components of the complex impedance have inverse relationships to each other with the frequency changes. As such, applying the AC signal at different frequencies allows distinguishing the resistive (frequency-independent) components from the inductive (proportional to f) component and also from the capacitive (proportional to 1/f) component, thereby significantly increasing the detectability. In some examples, multiple AC sub-signals (e.g., at different frequencies) are applied concurrently, thereby increasing the overall throughput. Alternatively, multiple AC sub-signals are applied in a frequency sweep.

In some examples, method 500 comprises obtaining (block 540) complex electrical impedance reading from electrodes 122. This operation is performed as test suspension 180 flows between electrodes 122 of AC-impedance detector 120. FIGS. 6A-6D illustrate various examples of these complex electrical readings. Each figure corresponds to a different type of impedance-encoded particles 190.

In some examples, method 500 comprises identifying (block 550) each type of impedance-encoded particles 190 based on the complex electrical impedance reading, obtained from electrodes 122 of AC-impedance detector 120 (in the previous operation). More specifically, identifying each type of impedance-encoded particles 190 further comprising identifying each of analytes. For example, the complex electrical impedance reading, obtained in the previous operation (block 540), is compared to different signatures available in a database, e.g., previously generated from calibration samples. In some examples, a combination of linear spectral un-mixing and machine learning is used to refine the particle identification. In some cases, this can be performed using any combination of dedicated hardware, firmware, and software.

If method 500 is also used to optically detect the analytes (decision block 555), then method 500 proceeds with optically detecting (block 560) the concentration of each analyte, bound to impedance-encoded particles 190. This operation may be performed while flowing test suspension 180 through multiplexed impedance-based detection system 100, e.g., using optical detector 130 of impedance-based detection system 100. This concentration value is then matched with the analyte identification. As such, in some examples, impedance-based detection system 100 can specifically identify each of multiple analytes and determine the concentration of each identified analyte.

If method 500 is also used to sort impedance-encoded particles 190 (decision block 565), then method 500 proceeds with sorting impedance-encoded particles 190. This sorting operation is performed after identifying different types of impedance-encoded particles 190. As such, impedance-encoded particles 190 may be collected or analyzed using other methods, either as part of system 100 or on another system. More specifically, each type of impedance-encoded particles 190 may be separated from the rest of impedance-encoded particles 190 (present in test suspension 180) and individually analyzed.

ADDITIONAL APPLICATION EXAMPLES

In some examples, multiplexed impedance-based detection methods and corresponding systems are used for molecule sensing. These methods and systems are configured to detect and quantify small molecules, such as free amino acids (e.g., performing total and specific abundances and chirality measurements), polycyclic aromatic hydrocarbons (PAHs), reactive oxidative species or free radicals, and possibly metabolites or nutrients. Larger molecules, such as DNA/RNA or long-chain fatty acids could also be detected. The functionalization of impedance-encoded particles is specifically tailored to one or more molecules to be sensed using these methods and systems.

In some examples, after identifying the particles based on their impedance they may be sorted based on their type for analysis by a different system which may include DNA/RNA sequencing, gas chromatography, high-performance liquid chromatography, electrophoresis, liquid or ion chromatography, or other techniques.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A multiplexed impedance-based detection method for identifying each type of impedance-encoded particles using a multiplexed impedance-based detection system, the method comprising:
   flowing a test suspension, comprising the impedance-encoded particles and suspension fluid, through the multiplexed impedance-based detection system, comprising an AC-impedance detector, wherein:
   each of the impedance-encoded particles comprises a particle core and a particle shell, surrounding the particle core and protecting the particle core from the suspension fluid,
   the impedance-encoded particles comprise first impedance-encoded type particles and second impedance-encoded type particles,
   the particle core of the first impedance-encoded type particles and the particle core of the second impedance-encoded type particles have different core material compositions such that these different core material compositions are specifically selected to produce distinctive complex electrical impedance readings to differentiate between the first impedance-encoded type particles and the second impedance-encoded type particles based on the distinctive complex electrical impedance readings from the impedance-encoded particles in the test suspension,
   the first impedance-encoded type particles are functionalized with a first functionalization component that selectively binds to a first analyte in the test suspension, and
   the second impedance-encoded type particles are functionalized with a second functionalization component, different from the first functionalization component, that selectively binds to a second analyte, different from the first analyte, in the test suspension;
   applying an AC signal to electrodes of the AC-impedance detector;
   obtaining complex electrical impedance reading from the electrodes as the test suspension flows between the electrodes of the AC-impedance detector, wherein the complex electrical impedance produced by the first impedance-encoded type particles is different from the complex electrical impedance produced by the second impedance-encoded type particles; and
   identifying each type of the impedance-encoded particles thereby differentiating the first impedance-encoded type particles and the second impedance-encoded type particles based on the complex electrical impedance reading, obtained from the electrodes of the AC-impedance detector.

2. The method of claim 1, wherein identifying each type of the impedance-encoded particles comprises identifying each of the first analyte and the second analyte.

3. The method of claim 1, further comprising, while flowing the test suspension through the multiplexed impedance-based detection system, optically quantifying a concentration of each of the first analyte and the second analyte.

4. The method of claim 1, wherein:
the AC signal applied to the electrodes comprises multiple AC sub-signals having different frequencies, and
identifying each type of the impedance-encoded particles comprises distinguishing a resistive component, an inductive component, and a capacitive component of the complex electrical impedance.

5. The method of claim 4, wherein the multiple AC sub-signals are applied concurrently.

6. The method of claim 4, wherein the multiple AC sub-signals are applied sequentially or as a frequency sweep.

7. The method of claim 1, wherein the multiplexed impedance-based detection system comprises a microfluidic flow channel such that the test suspension is flown through the microfluidic flow channel.

8. The method of claim 1, wherein the particle core of the first impedance-encoded type particles and the particle core of the second impedance-encoded type particles comprise different numbers of core-forming nanoparticles.

9. The method of claim 1, wherein the particle core of the first impedance-encoded type particles and the particle core of the second impedance-encoded type particles have different sizes of the particle core.

10. The method of claim 1, wherein at least one of the particle core of the first impedance-encoded type particles and the particle core of the second impedance-encoded type particles is formed from a metal.

11. The method of claim 1, wherein the particle shell is formed poly(ethylene glycol).

12. The method of claim 1, wherein the particle shell comprises core-forming sub-particles, surrounding the particle core.

13. The method of claim 1, wherein each of the impedance-encoded particles further comprises a second particle shell, surrounding the particle shell and the particle core.

14. The method of claim 1, further comprising measuring luminescent or colorimetric properties of the impedance-encoded particles using an optical detector of the multiplexed impedance-based detection system.

15. The method of claim 1, wherein the impedance-encoded particles are free to move within the suspension fluid.

16. The method of claim 1, wherein the particle core of each of the impedance-encoded particles is formed by a single core-forming sub-particle.

17. The method of claim 1, wherein the particle core of each of the impedance-encoded particles is formed by multiple core-forming sub-particles.

18. The method of claim 17, wherein the multiple core-forming sub-particles of the particle core of the first impedance-encoded type particles have same material composition.

19. The method of claim 17, wherein the multiple core-forming sub-particles of the particle core of the first impedance-encoded type particles have different material compositions.

20. The method of claim 1, wherein identifying each type of the impedance-encoded particles is performed using a combination of linear spectral un-mixing and machine learning.

* * * * *